UNITED STATES PATENT OFFICE.

DAVID P. CLEVELAND, OF DALLAS, TEXAS, ASSIGNOR TO ED. WILKERSON AND J. A. BERGFELD, BOTH OF DALLAS, TEXAS.

PAINT AND VARNISH REMOVING PROCESS.

1,370,188.     Specification of Letters Patent.     Patented Mar. 1, 1921.

No Drawing.     Application filed November 18, 1919. Serial No. 338,940.

*To all whom it may concern:*

Be it known that I, DAVID P. CLEVELAND, a citizen of the United States, residing at Dallas, in the county of Dallas and State of Texas, have invented certain new and useful Improvements in Paint and Varnish Removing Processes, of which the following is a specification.

This process has to do with the removing of paint, varnish, enamel and the like from coated surfaces, and has particularly to do with the removal of coatings after they have dried, for such purposes as re-painting or re-coating. The coated article may be a motor vehicle, furniture, walls, floors, or other coated objects.

Various compositions and processes have been evolved for the purpose of removing paint and varnish, but they are more or less laborious, slow or expensive. I am to carry out the removing process quickly, at a low cost and with more or less unskilled labor.

In accordance with the present invention a solution composed chiefly of water and a caustic alkali such as caustic soda, is atomized onto the surface under treatment, by means of a fluid under pressure, such as compressed air; the solution being applied to the surface while hot, having been previously heated. The solution may include a small proportion of an alkaline earth metal hydroxid, such as quick-lime.

The solution is applied by means of a nozzle and is sprayed over the surface just like one would wash off a coating of mud or the like from a vehicle, the atomized stream being played back and forth over an area until the coating dissolves and flows like a liquid. It is preferable to use a suitable atomizing nozzle having connection with a suitable source of fluid under pressure, such as compressed air; and also suitably connected with a vat or other receptacle containing the hot solution. Ordinary hose may be used to conduct the compressed fluid and solution. After the coating has been removed the surface is washed off by means of a stream of water and a wet sponge.

I have secured very good results by using a solution composed of about 10 pounds of caustic soda, 1¼ pounds of lime dissolved in 25 gallons of water. This solution may be diluted for certain kinds of work, particularly where the surface is not enameled or the paint coating is thin. Good results may be had by using either sodium hydroxid or potassium hydroxid or any mixture of chemicals which will give either of these hydroxids. The function of the hydroxid is to enter into combination with the oil of the paint and convert it into soap, which dissolves and is washed away, thus causing the pigment to become loose and in turn be washed away by the water. Lime is added to convert the sodium or potassium carbonate present in the commercial sodium or potassium hydroxid as bought, into sodium or potassium hydroxid.

By use of this invention it is possible to clean a surface in a very short time and without hand labor. For instance the coating may be removed from the body and fenders of a small automobile in about half an hour; while the coating on a large automobile can easily be removed in from one to two hours. Where the coating is removed from aluminum a longer time is required owing to the porosity of said metal which causes the coating to adhere more tenaciously.

It is pointed out that the compressed fluid is employed solely to atomize the solution and project it onto the surface; and further that unless applied while hot the solution would be of no value in the present process.

What I claim, is:

1. A process of removing finish coating from a finish-coated surface, which comprises atomizing against such surface, by the agency of a blast of air, an alkaline liquor capable of disintegrating the said finish coating, such liquor being hot when applied to said surface.

2. A process of removing finish coating from a finish-coated surface, which comprises atomizing against such surface, by the agency of a blast of air, an alkaline liquor capable of disintegrating the said finish coating, such liquor being hot when applied to said surface, such liquor comprising a solution of an alkali metal hydroxid and an alkaline-earth metal hydroxid.

3. A process of removing finish coating from a finish-coated surface, which comprises atomizing against such surface, by the agency of a blast of air, an alkaline liquor capable of disintegrating the said finish coating, such liquor being hot when applied to said surface, and thereafter washing off the loosened coating.

In testimony whereof I affix my signature.

DAVID P. CLEVELAND.